(12) United States Patent
Kurtsov (10) Patent No.: US 11,366,922 B1
(45) Date of Patent: Jun. 21, 2022

(54) SYSTEMS AND METHODS FOR TRANSFERRING CAPABILITIES

(71) Applicant: Facebook Technologies, LLC, Menlo Park, CA (US)

(72) Inventor: Gleb Kurtsov, San Jose, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 273 days.

(21) Appl. No.: 16/688,593

(22) Filed: Nov. 19, 2019

(51) Int. Cl.
*H04L 29/06* (2006.01)
*G06F 21/62* (2013.01)
*G06F 21/57* (2013.01)
*G06F 21/51* (2013.01)
*H04L 9/40* (2022.01)

(52) U.S. Cl.
CPC .......... *G06F 21/6227* (2013.01); *G06F 21/51* (2013.01); *G06F 21/57* (2013.01); *H04L 63/20* (2013.01); *G06F 2221/2113* (2013.01); *G06F 2221/2141* (2013.01)

(58) Field of Classification Search
CPC ...... G06F 21/6227; G06F 21/51; G06F 21/57; H04L 63/20; H04L 63/205; H04L 63/105
USPC .............................................................. 726/1
See application file for complete search history.

(56) References Cited

U.S. PATENT DOCUMENTS 7,665,143 B2 * 2/2010 Havens .................. G06F 21/51
726/26

* cited by examiner

*Primary Examiner* — Longbit Chai
(74) *Attorney, Agent, or Firm* — Baker Botts L.L.P.

(57) ABSTRACT

In one embodiment, a method includes receiving a request to transfer a handle to an object from a first process to a second process, accessing a first security context of the handle and a second security context of the second process, identifying one or more security policies based on at least one of the first security context and the second security context, determining that the handle is allowed to be transferred to the second process by applying the one or more security policies on the first security context of the handle and the second security context of the second process, and transferring the handle to the second process in response to the request.

26 Claims, 5 Drawing Sheets

SYSTEMS AND METHODS FOR TRANSFERRING CAPABILITIES

TECHNICAL FIELD

This disclosure generally relates to an operating system of computing devices, and in particular, related to a capability-based operating system.

BACKGROUND

A kernel is a software-based program used by an operating system of a computing device to connect software applications running on the computing device to the underlying hardware. The kernel may be one of the first programs loaded on start-up. The kernel may handle the rest of start-up as well as input/output requests from processes, translating the requests into data-processing instructions for the central processing unit. The kernel may also perform its tasks, such as running processes, managing hardware devices, and handling interrupts, in this protected kernel space. Different types of the kernel (e.g., monolithic kernel, microkernel, hybrid kernel, exo kernel, nano kernel, etc.) can be used for various applications. For example, a monolithic kernel is an operating system architecture where the entire operating system (which includes the device drivers, file system, and the application IPC) is working in kernel space. Monolithic kernels are able to dynamically load/unload executable modules at runtime. A microkernel is the near-minimum amount of software for implementing minimal operating system services (e.g., low-level address space management, thread management, and inter-process communication). Other services (e.g., applications, libraries, file systems, drivers, etc.), unlike a monolithic kernel, can be implemented in user-space.

Certain microkernels can provide improved security than the monolithic kernel, as all code should have only the privileges needed to provide the required functionality. Despite the improvements, both types of kernels can still be exposed to high-security risk. For example, a compromised process A can receive the privilege from a process B using a third party process/service C. Although the processes A and B are not allowed to communicate directly, the process A can trick the third party process/service C to obtain the privilege from process B and transfer the privilege to the compromised process A. The transferred privilege can also be used for communicating with process B. Such attack can elevate privileges of the process A without compromising process B.

SUMMARY OF PARTICULAR EMBODIMENTS

The purpose and advantages of the disclosed subject matter will be set forth in the description that follows. Additional advantages of the disclosed subject matter will be realized and attained by the methods and systems particularly pointed out in the written description and claims, as well as from the appended drawings.

Embodiments of the invention may include or be implemented in conjunction with an operating system. An operating system can include system software that can manage computer hardware and software resources and provide common services for computer processes. In certain embodiments, the disclosed subject matter can provide systems and methods for controlling access of the process to an object. In particular, the disclosed systems and methods can improve the security level by limiting the access of untrusting entities using a handle. For example, the subject matter provide an example method, by an operating system executing on a computing device, comprising receiving a request to transfer a handle to an object from a first process to a second process, accessing a first security context of the handle and a second security context of the second process, identifying one or more security policies based on at least one of the first security context and the second security context, determining that the handle is allowed to be transferred to the second process by applying the one or more security policies on the first security context of the handle and the second security context of the second process; and transferring the handle to the second process in response to the request. A handle can be an abstract reference to system resources. Each handle can have associated access rights, specifying operations that can be performed on the kernel object backed by the handle. In non-limiting embodiments, the handle can be created by a process and obtain a security context from the process. For example, the handle can be created by the first process, and the first security context of the handle can be obtained from a third security context of the first process. A security context can include a set of labels that identifies a policy that the security context belongs to. The security policy can be a collection of rules executed by a framework. Processes are prevented from overriding or modifying the policy under the framework. The framework can execute multiple policies concurrently. The security policies can be executed by a mandatory access control (MAC).

In certain embodiments, the disclosed systems can update the security context for processes after transferring a handle. In particular, the disclosed method can further include updating the first security context of the handle based on the second security context of the second process. For example, after a transfer operation, the disclosed operating system can update the security context for both channel endpoints to match the security context of a requesting process with the security context of the target process.

In certain embodiments, the disclosed subject matter provides one or more computer-readable non-transitory storage media embodying software that is operable when executed to receive a request to transfer a handle to an object from a first process to a second process, access a first security context of the handle and a second security context of the second process, identify one or more security policies based on at least one of the first security context and the second security context, determine that the handle is allowed to be transferred to the second process by applying the one or more security policies on the first security context of the handle and the second security context of the second process, and transfer the handle to the second process in response to the request. In non-limiting embodiments, the disclosed media can further update the first security context of the handle based on the second security context of the second process.

In certain embodiments, the disclosed subject matter provides a system comprising one or more processors, and one or more computer-readable non-transitory storage media coupled to one or more of the processors. The system comprises instructions operable when executed by one or more of the processors to receive a request to transfer a handle to an object from a first process to a second process, access a first security context of the handle and a second security context of the second process, identify one or more security policies based on at least one of the first security context and the second security context, determine that the handle is allowed to be transferred to the second process by applying the one or more security policies on the first security context of the handle and the second security context of the second process, and transfer the handle to the second process in response to the request. In non-limiting embodiments, the disclosed system can further update the first security context of the handle based on the second security context of the second process.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Certain capability-based operating systems can utilize capability-based security which can use a capability (i.e., token of authority) to control access of processes to an object. In certain capability-based operating systems, a user can access the capability or objects via a handle. A handle is an abstract reference to system resources. Each handle can have associated access rights, specifying operations that can be performed on the kernel object backed by the handle. The handle can be used to limit the access of untrusting entities to an object by revoking a transfer right to the handle. In certain embodiments, however, revocation of the transfer right can be insufficient to protect operating systems. For example, a compromised process A can receive a handle from a process B using a third party process/service C. Although the processes A and B are not allowed to communicate directly, the process A can trick the third party process/service C to obtain the handle from process B and transfer the handle to the compromised process A. The transferred handle can be used for communicating with process B. Such attack can elevate privileges of the process A without compromising the process B. Although certain capability-based operating systems can revoke the transfer right to prevent such attack, revocation of the "transfer" right is insufficient because it relies on application code correctness, and may not be applicable in processes providing services over IPC.

The disclosed subject matter provides methods and systems for transferring a handle with improved security. For example, the disclosed methods and systems can use a set of policies designed to control the handle transfer operation. Controlling the handle-transfer operation between processes using the disclosed model can reduce kernel entry points and kernel changes for tracking security contexts. The disclosed model can be used for various scenarios including service registry and launcher service.

Figure 1:
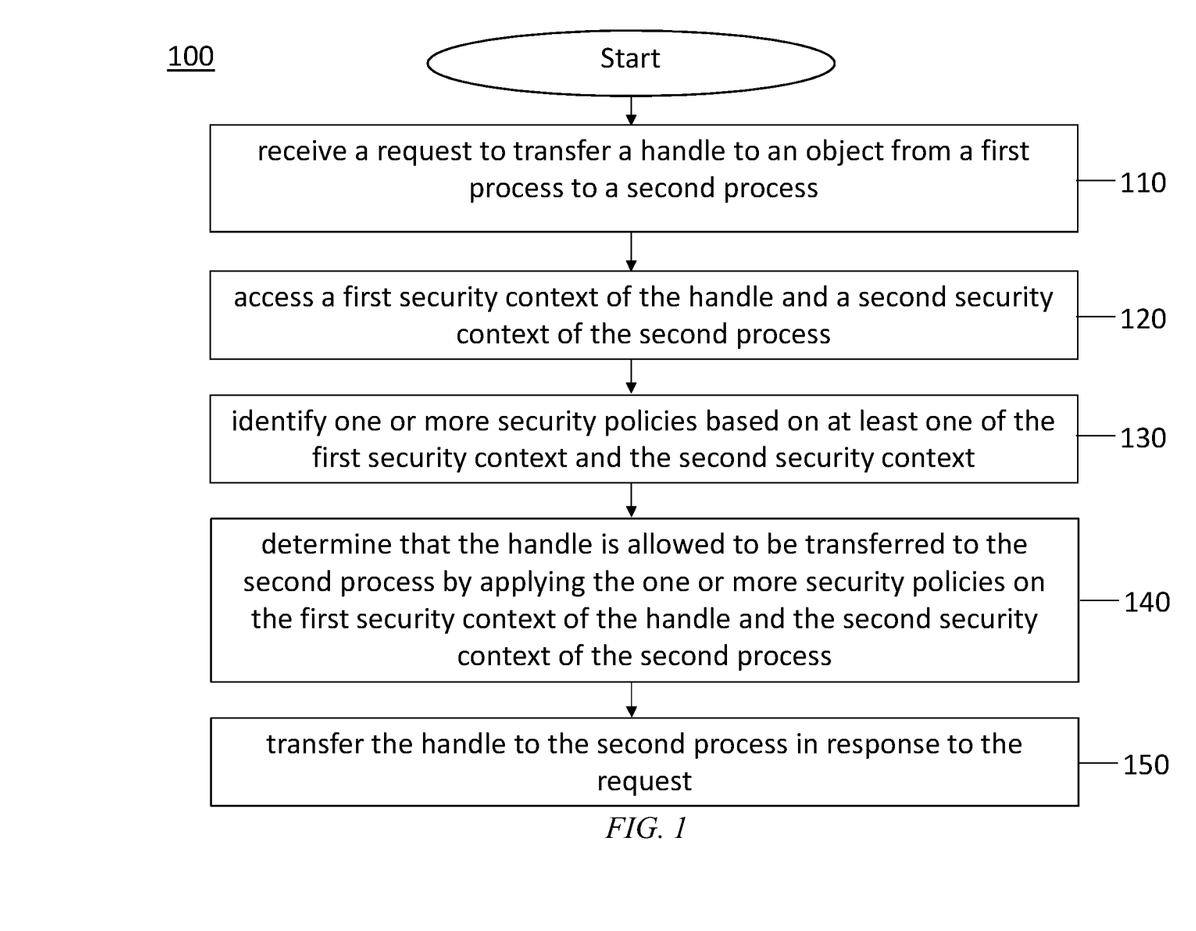
FIG. 1 illustrates an example method for transferring a handle.

FIG. 1 illustrates a flow diagram according to certain embodiments. In particular, FIG. 1 illustrates an example method 100 for transferring a handle to objects. The method may begin at step 110, where an operating system executing on a computing device can receive a request to transfer a handle to an object from a first process to a second process. The Handle can be a reference value to an object. The disclosed system can mediate access to an object via the handle which can function as a capability. For example, a handle can identify an object and associates access rights to the object. The object can include a network socket, a database connection, a directory, a TCP/UDP port, a memory segment, an IO device, or a combination thereof. In non-limiting embodiments, the handle can be transferred between processes which include associated access rights. In certain embodiments, a handle can be transferred between processes with associated access rights. The disclosed system can control processes to follow the principle of the least privilege by revoking access rights before transferring a handle to a process.

At step 120, the operating system can access a first security context of the handle and a second security context of the second process. In certain embodiments, each process can have an associated security context. The process security context can be defined in the trusted metadata. In non-limiting embodiments, launcher services can set this security context at process creation time. In non-limiting embodiments, the security context can include a set of labels that identifies a policy that the security context belongs to. For example, a label can be represented as a string identifying policy it belongs to (e.g. mls/secret, partition/10, or category/logger). Label semantics can depend on the policy. Policy implementation can have an internal state associated with the security context. In certain embodiments, a transferable handle can have an associated security context which is inherited from the process. For example, the handle can be created by the first process and the first security context of the handle can be obtained from a third security context of the first process. The first security context can be the same as the third security context, and thus the handle can inherit the security context of its creator process. In non-limiting embodiments, the handle security context can only be changed by the security policy implementation. In non-limiting embodiments, a handle representing a process and the process itself can have different associated security contexts. A channel can include two endpoints. The channel itself can have a security context, and two channel endpoints can have different security contexts. In certain embodiments, in order to guarantee policy consistency, a third-party package cannot define new labels unless the current policy explicitly supports the new labels. For example, although the third-party package may be allowed to add a new category, the package is not permitted to define new label (e.g., clearance/ultra-ultrasecret" with higher clearance level than the existing label (e.g., clearance/top-secret) for a confidentiality policy At step 130, the operating system can identify one or more security policies based on at least one of the first security context and the second security context. In certain embodiments, a security policy can be a collection of rules executed by a framework. The framework can support execution of multiple policies concurrently. In non-limiting embodiments, the framework can be a mandatory access control (MAC) framework, and the security policy can be implemented in general purpose programming language (e.g., C). When a process attempts to transfer a handle to an object to another process, the process may make a system call to the microkernel. Since processes in a microkernel architecture can be isolated from each other, handle transfers between processes need to go through the microkernel (e.g., via an IPC). Being the gate-keeper of handle transfers, the microkernel can be configured with the MAC framework to enforce handle-transfer policies. Policies enforced by the disclosed operating system kernel can examine security attributes/contexts of the handle to decide whether the access can take place. The disclosed MAC framework operations can be invisible to processes. In non-limiting embodiments, the disclosed MAC framework can be independent of capabilities. Processes can be prevented from overriding the policies and granting access to files or other processes. In certain embodiments, the disclosed MAC framework can prevent security policy from making decisions based on handle rights and changing handle rights. Since processes are prevented from overriding or modifying the policy under the MAC framework, the system can produce a global policy that enforces all processes to follow. In non-limiting embodiments, the MAC framework can execute multiple policies concurrently. The MAC framework can provide policy-agnostic infrastructures which do not dictate specific policy designs.

In certain embodiments, the disclosed policies can be generated based on lattice or information flow. For example, directional transfer operation from process A to process B can be defined as information flow between corresponding security contexts. The information flow policy can be a tuple of a partially ordered set of security contexts, "can-flow" relation between security contexts, and binary security contexts combining operators. In non-limiting embodiments, a policy can be defined in terms of lattices through high-level descriptions (e.g., text). The policy can evaluated in terms of lattices to check soundness and properties of the policy. In certain embodiments, the disclosed policies can be generated without using a lattice model. For example, the disclosed policies can be defined and implemented without using lattices.

In certain embodiments, the disclosed policies can dynamically change security contexts of a handle. Advanced policies can dynamically change handle security contexts based on multiple contexts. For example, during channel endpoint transfer operation, there are two processes, and two endpoint handles can be involved resulting in total of four security contexts. Accordingly, a handle transfer between different processes can be controlled based on the security model defined using lattice-based access control. In non-limiting embodiments, the disclosed policies can be defined by the lattice-based access control. Policies of the lattice-based models can be combined. In some embodiments, the lattice-based models can choose which modification in the security context can be supported by a dynamic policy. For example, multiple policies can be defined (e.g., as text) and implemented (e.g., with/without using lattices). By re-defining policies in terms of lattices, polices can be combined, and its soundness and properties can be evaluated.

In certain embodiments, the disclosed operating system can support a wide range of policies. For example, transfer of a handle can be performed under certain policies (e.g., partition, confidentiality, and categories). Under the partition policy, a handle can be transferred between processes which belong to the same partition or source process based on a hierarchical partition policy. For example, the transfer of a handle can be performed if the handle belongs to the same partition or partition level of the target process is lower than partition level of the handle security context. Unique partitions can be created implicitly for each package so that processes which belong to different packages but have the same label in metadata can have distinct partitions. Under the categories policy, a transfer can be performed when security contexts of a target process is a superset of categories of source process. For example, the transfer of a handle can be performed if a security context of a target process is a superset of the handle security context categories. Categories can be broad as "Network and Storage Access", "Microphone Access" or fine-grained to represent access to a service, e.g. "Logger Service". Under the confidentiality policy, a confidentiality model (e.g. "Secret", "Classified", "Unclassified") can be adopted to handle user private data. The confidentiality model can prevent a process handling user private data to transfer handles to processes that do not have corresponding access level.

In non-limiting embodiments, the disclosed policies can be static, and security contexts of a handle don't change after the transfer operation. In certain embodiments, security contexts of a handle can be dynamically modified. For example, a lattice model of secure information flow can be used to implement dynamic or conditional policies which can modify object's security context.

In non-limiting embodiments, the disclosed operating system can combine and support multiple information flow policies using a lattice structure. For example, hierarchical partition, categories, confidentiality can be defined using the lattice structure.

At step 140, the operating system can determine that the handle is allowed to be transferred to the second process by applying the one or more security policies on the first security context of the handle and the second security context of the second process. At step 150, the operating system can transfer the handle to the second process in response to the request.

The disclosed operating system can further perform additional steps for transferring a handle. As an example and not by way of limitation, the disclosed operating system can update the first security context of the handle based on the second security context of the second process. For example, after the channel transfer operation, the disclosed operating system can update the security context for both channel endpoints to match with the security context of the target process. In certain embodiments, attributes of a security context can be inherited from an originated process. A transferable handle can have an associated security context which is inherited from the process. For example, when a handle can be created by a process, a channel endpoint handle can inherit initial security contexts from the process and/or the process handle. In non-limiting embodiments, the handle can inherit its security context from its creator process. In some embodiments, user-controlled handles and handle access rights can be decoupled from global policies and security contexts so that the operating system can avoid relying on the user-controlled access right for individual handle when it makes access control decisions within the global policies.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for transferring a handle including the particular steps of the method of FIG. 1, this disclosure contemplates any suitable method for transferring a handle including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 2:
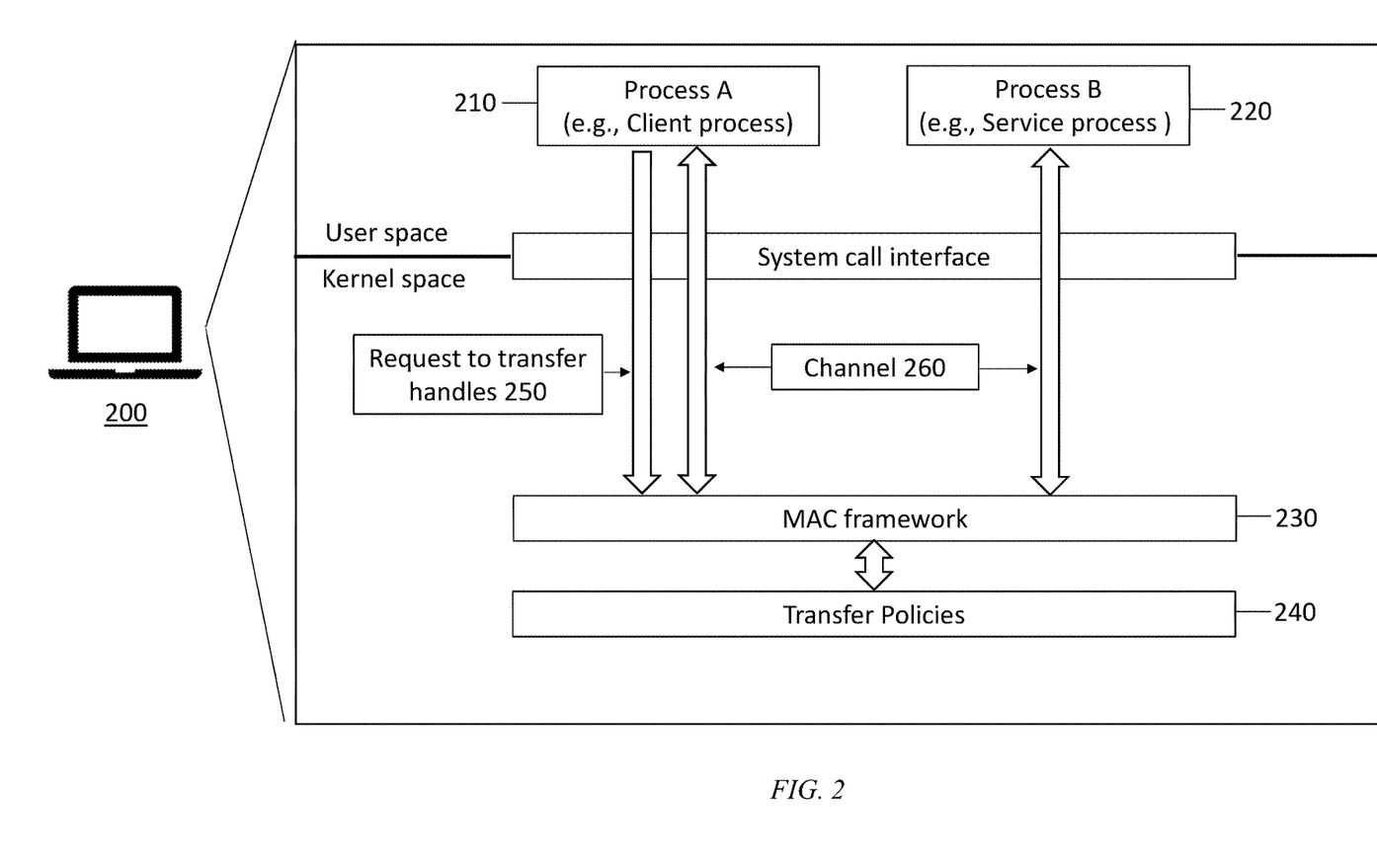
FIG. 2 illustrates an example computer system associated with capability-based operating systems.

FIG. 2 illustrates an example computer system associated with capability-based operating systems. In particular embodiments, the example computer system can include a client process A 210, a service process B 220, a framework 230, and transfer policies 240. A security policy can be a collection of rules executed by a framework. As shown in FIG. 2, the framework can be a MAC framework 230 which can be a gate-keeper for transferring a handle. The handle can be a reference to a kernel object. The kernel object can include, for example, a channel, a channel endpoint, a shared memory, etc.). The MAC framework 240 can access and examine security attributes/contexts of a handle based on the transfer policies 240 to decide whether the request can take place. The security attributes/context can be defined in the trusted metadata. The MAC framework can control the transfer of handles. In order to transfer handles between two processes, processes need a channel (e.g., IPC channel) established between them. Handles can be transferred through the channel as a part of the message. The handle transfer can be performed implicitly by the kernel when one process sends a message to another process. The process A 210 can create a shared memory segment by instructing the kernel to create the shared memory. Then, the kernel can return a handle to the shared memory object to the process A. The process A 210 can send a message containing the handle through the channel to the process B 220. The kernel can perform the actual handle transfer (moving handle from process A 210 to process B 220) as part of the message-send operation. Upon successful completion of transfer operation, the processes A and B can use the shared memory segment. The MAC framework 230 can enforce the access control for the handle in the shared memory.

The same applies to other types of objects. For example, transferring channel endpoints can be one of the example applications. When the request 250 is determined as a valid request based on the transfer policies 240, a channel 260 which connects the processes A 210 and B 220 can be created by transferring a channel endpoint to each of the process A 210 and B 220. A handle representing a process and the process itself can have different associated security contexts. For example, during channel endpoint transfer operation, there are two processes 210, 220 and two endpoint handles resulting in total four security contexts. Such configuration can provide additional security for the transfer of the process handle. The channel endpoint handle can inherit initial security contexts from the process or the process handle. The MAC framework 230 can control the transfer of the handle between process A and process B. After transferring the channel handles, the security context of both endpoint handles can be updated to match the security context of both processes A and B. Through the channel 260, the process A can receive the handle and access to the process B. If the request 250 is not valid based on the transfer policies 240, the client process A can be forbidden to transfer a handle to the service process B by the MAC framework. For example, when security contexts of the client process A 210 do not match or satisfy the transfer policies 240, the channel endpoints and handle cannot be transferred by the framework. Process A can have a handle referencing Process B in the same way as the processes A and B can have handles referencing endpoints of the channel. In particular embodiments, method 100 may be performed by the operating system.

Figure 3:
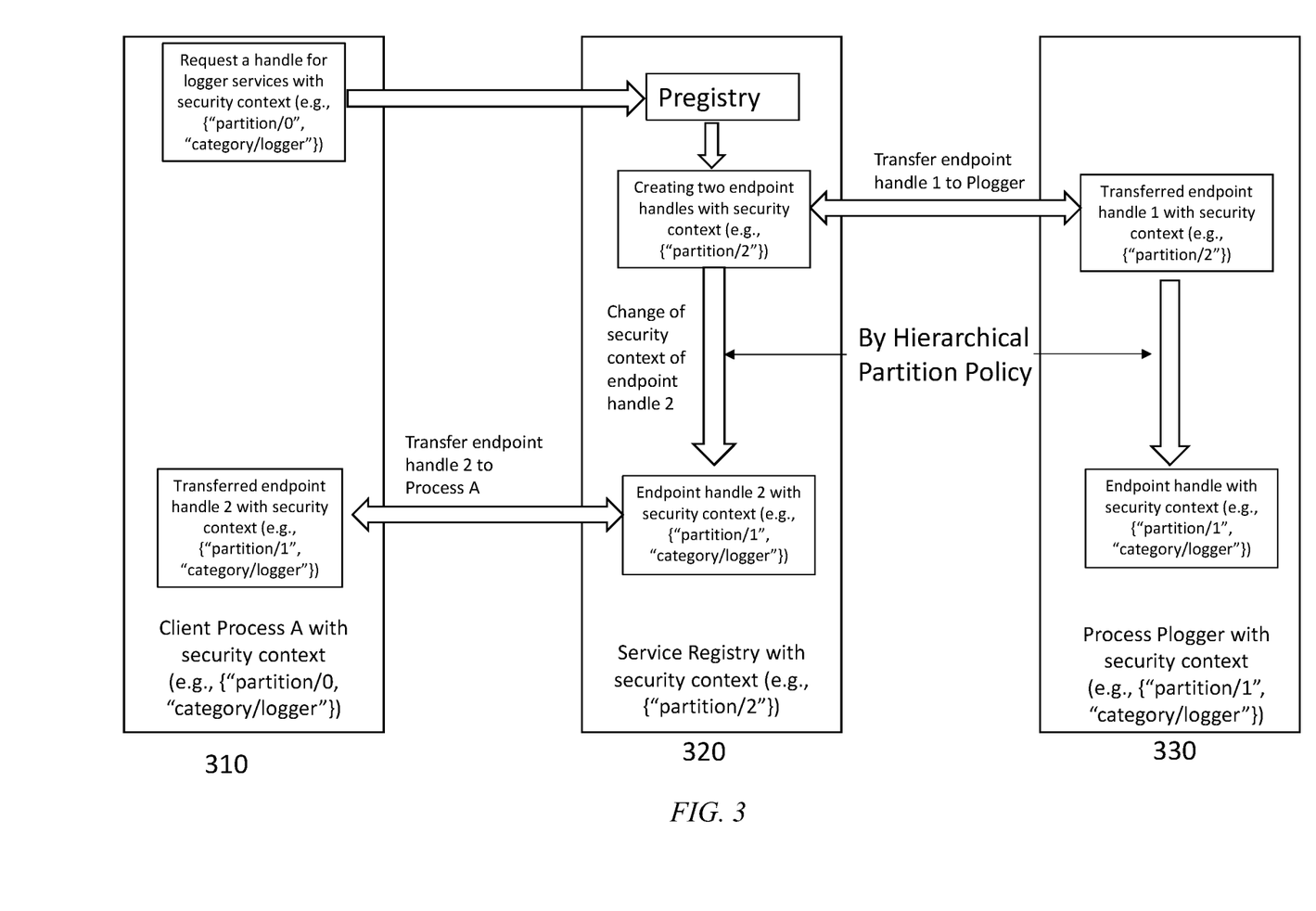
FIG. 3 illustrates an example system for transferring security contexts of process and handle.

FIG. 3 illustrates an example system for transferring security contexts of process and handle based on policy. In particular embodiments, FIG. 3 illustrates a service registry network environment 300 associated a client process 310, a service registry 320, and a process logger (plogger) 330. As shown in FIG. 3, the example service registry network can utilize category policies and hierarchical partition policies. Under the hierarchical partition policy, the transfer of a handle can be performed if the handle belongs to the same partition or partition level of the target process is lower than partition level of the handle security context. After the transfer operation, the security context can be altered for both endpoints to match security context of the target process. Unique partitions can be created implicitly for each package so that processes which belong to different packages but have the same "partition/1" label in metadata can have distinct partitions. Under the categories policy, the transfer of a handle can be performed if a security context of a target process is a superset of the handle security context categories. After the transfer operation, the category security context can altered for both endpoints to match category security context of the target process. In the example service registry network, the service registry (Pregistry) can include a security context (e.g., "partition/2"). Client processes Pa and Pb require access to a logger and microphone services. For example, Pa can include corresponding security contexts (e.g., "partition/0" and "category/logger"} and Pb can include corresponding security context (e.g., "partition/0" and "category/mic"). In order to provide a handle for the service requested by the client, the Pregistry can create a new channel and transfer an endpoint to the service process (e.g., Plogger) and the client process (e.g., Pa). Pa can request a logger service handle through the Pregistry. Channel endpoint handles can inherit initial security contexts from the process. For example, both channel endpoint handles can have security context of {"partition/2" }. After creating a channel to the service process (i.e., Plogger), the Pregistry can transfer a first endpoint handle to Plogger. The transfer of the first endpoint handle can be performed by partition policy because "partition/1"<"partition/2". A categories policy also can allow the transfer because a handle security context for the categories policy is an empty set. After transfer operation, security contexts for both endpoints can be {"partition/i", "category/logger" }. Transfer of the second endpoint from Pregistry to Pa can be performed in a similar way: "partition/0"<"partition/i", {"category/logger" }={"category/logger" }.

Figure 4:
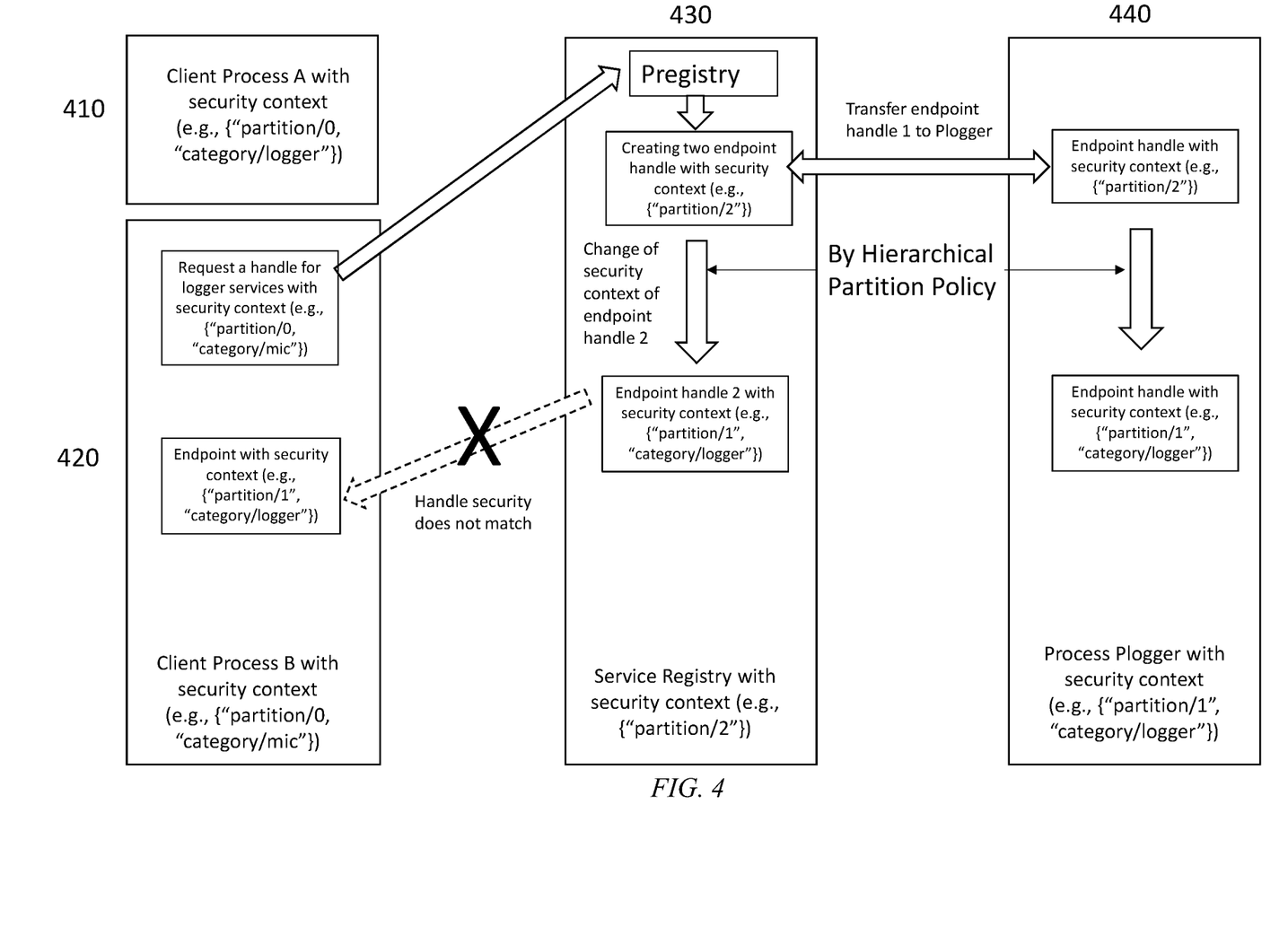
FIG. 4 illustrates another example system for transferring security contexts of process and handle.

FIG. 4 illustrates another example system for transferring security contexts of process and handle based on policy. In particular embodiments, FIG. 4 illustrates a service registry channel associated the client processes Pa 410 and Pb 420, a service registry 430, and a plogger 440. A client process can be forbidden to access logger service by enforcing MAC policy. For example, Pb can include corresponding security context (e.g., "partition/0" and "category/mic"). When Pb requests a logger service handle through the Pregistry, the transfer of a handle or an endpoint from Pregistry to Pb can be inhibited because the handle security context for the categories policy does not match: {"category/logger"}≠{"category/mic"}. No additional checks in client or services source code is required. Pb can obtain channel to Pmic only. Pa and Pb are not permitted to transfer handles between themselves, as each of Pa and Pb belongs to a separate partition at the same partition level "partition/0".

In certain embodiments, as shown in FIG. 4, further logger dependency can be added to a service process Pmic. For example, the Pmic security context can be {"partition/1", "category/mic", "category/logger"}. The security context forces that the Pmic needs to have an endpoint handle connected to the Plogger, but the Pmic cannot transfer any handles to or from Plogger directly, as the transfer is restricted by hierarchical partition policy. The Logger service handle needs be transferred by the Service Registry.

Figure 5:
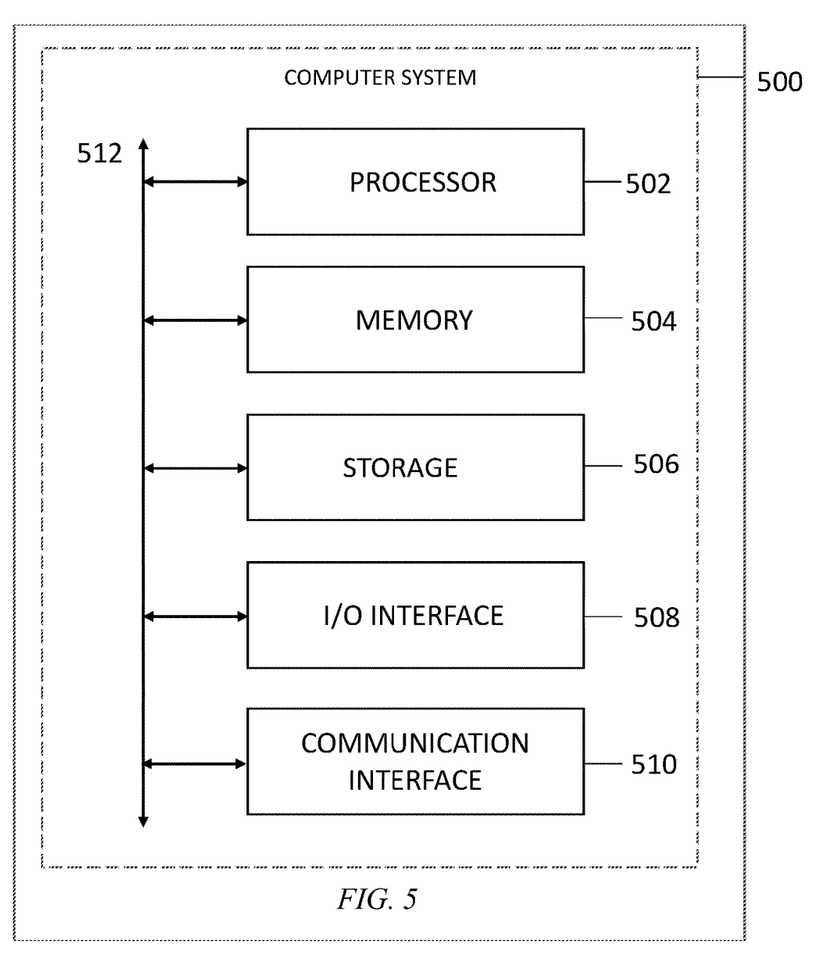
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides the functionality described or illustrated herein. Particular embodiments include one or more portions of one or more computer systems 500. Herein, the reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500, taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real-time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up the virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor, or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (for example, another computer system 500) to memory 504. Processor 502 may then load the instructions from memory 504 to an internal register or internal cache. To execute the instructions, processor 502 may retrieve the instructions from the internal register or internal cache and decode them. During or after the execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an operating system executing on a computing device:
    receiving a request to transfer a handle to an object from a first process to a second process;
    accessing a first security context of the handle and a second security context of the second process;
    identifying one or more global handle-transfer security policies enforced by a mandatory access control (MAC) of the operating system, based on at least one of the first security context and the second security context, wherein the one or more handle-transfer security policies comprise one or more rules designed to control a transfer operation of the handle and are executed by the MAC;
    determining, by the MAC, that the handle is allowed to be transferred to the second process by applying the one or more global handle-transfer security policies executed by the MAC on the first security context of the handle and the second security context of the second process, wherein the one or more global handle-transfer security policies comprise a partition policy, a confidentiality policy, a category policy, or combinations thereof;
    in response to determining that the handle is allowed to be transferred to the second process, creating a channel that connects the first process and the second process through the MAC for transferring the handle; and
    transferring the handle to the second process in response to the request.

2. The method of claim 1, wherein the handle is created by the first process; and
    wherein the first security context of the handle is obtained from a third security context of the first process.

3. The method of claim 2, wherein the first security context is the same as the third security context.

4. The method of claim 1, further comprising:
    updating the first security context of the handle based on the second security context of the second process.

5. The method of claim 1, wherein the handle is a reference value to the object.

6. The method of claim 1, wherein the security contexts comprise a set of labels, that identifies a policy that the security contexts belong to.

7. The method of claim 1, wherein the handle is transferred between the first process and the second process under the partition policy when both processes belong to a same partition or a source process.

8. The method of claim 1, wherein the handle is transferred between the first process and the second process under the category policy when the second security context of the second process is a superset of a category of a handle security source process.

9. The method of claim 1, wherein the handle is transferred between the first process and the second process under the confidentiality policy when a confidentiality model allows a transfer of the handle, wherein the confidentiality model is adopted to prevent the transfer of the handle that does not have a corresponding access level.

10. One or more computer-readable non-transitory storage media embodying software that is operable when executed to:
    receive a request to transfer a handle to an object from a first process to a second process;
    access a first security context of the handle and a second security context of the second process;
    identify one or more global handle-transfer security policies, enforced by a mandatory access control (MAC) of the operating system, based on at least one of the first security context and the second security context, wherein the one or more handle-transfer security policies comprise one or more rules designed to control a transfer operation of the handle and are executed by the MAC;
    determine, by the MAC, that the handle is allowed to be transferred to the second process by applying the one or more global handle-transfer security policies executed by the MAC on the first security context of the handle and the second security context of the second process, wherein the one or more global handle-transfer security policies comprise a partition policy, a confidentiality policy, a category policy, or combinations thereof;
    in response to determining that the handle is allowed to be transferred to the second process, create a channel that connects the first process and the second process through the MAC for transferring the handle; and
    transfer the handle to the second process in response to the request.

11. The media of claim 10, wherein the handle is created by the first process; and
    wherein the first security context of the handle is obtained from a third security context of the first process.

12. The media of claim 11, wherein the first security context is the same as the third security context.

13. The media of claim 10, wherein the media is further configured to update the first security context of the handle based on the second security context of the second process.

14. The media of claim 10, wherein the security contexts comprise a set of labels, that identifies a policy that the security contexts belong to.

15. The media of claim 10, wherein the handle is a reference value to the object.

16. The media of claim 10, wherein the handle is transferred between the first process and the second process under the partition policy when both processes belong to a same partition or a source process.

17. The media of claim 10, wherein the handle is transferred between the first process and the second process under the category policy when the second security context of the second process is a superset of a category of a handle security source process.

18. The media of claim 10, wherein the handle is transferred between the first process and the second process under the confidentiality policy when a confidentiality model allows a transfer of the handle, wherein the confidentiality model is adopted to prevent the transfer of the handle that does not have a corresponding access level.

19. A system comprising:
one or more hardware processors; and
one or more computer-readable non-transitory storage media coupled to one or more of the processors and comprising instructions operable when executed by one or more of the processors to cause the system to:
receive a request to transfer a handle to an object from a first process to a second process;
access a first security context of the handle and a second security context of the second process;
identify one or more global handle-transfer security policies, enforced by a mandatory access control (MAC) of the operating system, based on at least one of the first security context and the second security context, wherein the one or more handle-transfer security policies comprise one or more rules designed to control a transfer operation of the handle and are executed by the MAC;
determine, by the MAC, that the handle is allowed to be transferred to the second process by applying the one or more global handle-transfer security policies executed by the MAC on the first security context of the handle and the second security context of the second process, wherein the one or more global handle-transfer security policies comprise a partition policy, a confidentiality policy, a category policy, or combinations thereof;
in response to determining that the handle is allowed to be transferred to the second process, create a channel that connects the first process and the second process through the MAC for transferring the handle; and
transfer the handle to the second process in response to the request.

20. The system of claim 19, wherein the handle is created by the first process; and
wherein the first security context of the handle is obtained from a third security context of the first process.

21. The system of claim 20, wherein the first security context is the same as the third security context.

22. The system of claim 19, wherein the system is further configured to update the first security context of the handle based on the second security context of the second process.

23. The system of claim 19, wherein the security contexts comprise a set of labels, that identifies a policy that the security contexts belong to.

24. The system of claim 19, wherein the handle is transferred between the first process and the second process under the partition policy when both processes belong to a same partition or a source process.

25. The system of claim 19, wherein the handle is transferred between the first process and the second process under the category policy when the second security context of the second process is a superset of a category of a handle security source process.

26. The system of claim 19, wherein the handle is transferred between the first process and the second process under the confidentiality policy when a confidentiality model allows a transfer of the handle, wherein the confidentiality model is adopted to prevent the transfer of the handle that does not have a corresponding access level.

* * * * *